United States Patent

Simmons et al.

(10) Patent No.: US 9,411,431 B2
(45) Date of Patent: Aug. 9, 2016

(54) TRACKING A POSITION IN RELATION TO A SURFACE

(75) Inventors: Asher Simmons, Corvallis, OR (US); James D. Bledsoe, Corvallis, OR (US)

(73) Assignee: Marvell World Trade Ltd., St. Michael (BB)

(*) Notice: Subject to any disclaimer, the term of this patent is extended or adjusted under 35 U.S.C. 154(b) by 1720 days.

(21) Appl. No.: 11/951,251

(22) Filed: Dec. 5, 2007

(65) Prior Publication Data

US 2008/0159088 A1 Jul. 3, 2008

Related U.S. Application Data

(60) Provisional application No. 60/882,771, filed on Dec. 29, 2006.

(51) Int. Cl.
*G06F 3/033* (2013.01)
*G06F 3/03* (2006.01)
*G06F 3/0354* (2013.01)

(52) U.S. Cl.
CPC .......... *G06F 3/0317* (2013.01); *G06F 3/03543* (2013.01)

(58) Field of Classification Search
CPC .......................... G06F 3/0317; G06F 3/03543
USPC .......................................... 345/156, 163, 166
See application file for complete search history.

(56) References Cited

U.S. PATENT DOCUMENTS

| | | | |
|---|---|---|---|
| 3,359,425 A | 12/1967 | Smith | |
| 5,278,582 A | 1/1994 | Hongo | |
| 5,387,976 A | 2/1995 | Lesniak | |
| 5,446,559 A | 8/1995 | Birk | |
| 5,461,680 A | 10/1995 | Davis | |
| 5,578,813 A | 11/1996 | Allen et al. | |
| 5,927,872 A * | 7/1999 | Yamada | B41J 2/36 400/88 |
| 5,930,466 A | 7/1999 | Rademacher | |
| 5,988,900 A | 11/1999 | Bobry | |
| 6,209,996 B1 | 4/2001 | Gasvoda et al. | |
| 6,259,826 B1 | 7/2001 | Pollard et al. | |
| 6,326,950 B1 | 12/2001 | Liu | 345/163 |
| 6,348,978 B1 | 2/2002 | Blumer et al. | |
| 6,357,939 B1 | 3/2002 | Baron | |
| 6,360,656 B2 | 3/2002 | Kubo et al. | |
| 6,384,921 B1 | 5/2002 | Saijo et al. | |

(Continued)

FOREIGN PATENT DOCUMENTS

| | | |
|---|---|---|
| AU | 2006252324 B1 | 1/2007 |
| EP | 0655706 A1 | 5/1995 |

(Continued)

OTHER PUBLICATIONS

PCT International Search Report and Written Opinion dated Jul. 1, 2008, in International application No. PCT/US2007/026067 (12 pages).

(Continued)

*Primary Examiner* — Jonathan Boyd

(57) ABSTRACT

A tracking device is provided for tracking a position of the tracking device in relation to a surface. The tracking device has a first optical sensor to capture a primary image of the surface. A second optical sensor is provided to capture a secondary image of the surface. A processor evaluates the primary and secondary images to determine a movement of the tracking device in relation to the surface.

20 Claims, 4 Drawing Sheets

(56) References Cited

U.S. PATENT DOCUMENTS

| | | | |
|---|---|---|---|
| 6,846,119 B2 | 1/2005 | Walling | |
| 6,952,880 B2 | 10/2005 | Saksa | |
| 7,038,712 B1 | 5/2006 | Livingston et al. | |
| 7,200,560 B2 | 4/2007 | Philbert | |
| 7,246,958 B2 | 7/2007 | Saund et al. | |
| 7,297,912 B1 * | 11/2007 | Todoroff | G01J 1/32 250/205 |
| 7,336,388 B2 | 2/2008 | Breton | |
| 7,410,100 B2 | 8/2008 | Muramatsu | |
| 7,470,021 B2 | 12/2008 | Silverbrook | |
| 7,591,166 B2 | 9/2009 | Ueda et al. | |
| 7,607,749 B2 | 10/2009 | Tabata et al. | |
| 7,748,839 B2 | 7/2010 | Noe et al. | |
| 7,787,145 B2 | 8/2010 | Robertson et al. | |
| 7,929,019 B2 | 4/2011 | Ohmura et al. | |
| 7,949,370 B1 | 5/2011 | Bledsoe et al. | |
| 7,988,251 B2 | 8/2011 | Dimitrijevic et al. | |
| 2001/0019340 A1 | 9/2001 | Kubo et al. | |
| 2002/0154186 A1 | 10/2002 | Matsumoto | |
| 2002/0158955 A1 | 10/2002 | Hess et al. | |
| 2003/0035039 A1 | 2/2003 | Kanome et al. | |
| 2003/0150917 A1 | 8/2003 | Tsikos et al. | |
| 2004/0021912 A1 | 2/2004 | Tecu et al. | |
| 2004/0027443 A1 | 2/2004 | Trent | |
| 2004/0109034 A1 | 6/2004 | Brouhon | |
| 2004/0183913 A1 | 9/2004 | Russell | |
| 2004/0208346 A1 | 10/2004 | Baharav et al. | |
| 2005/0001867 A1 | 1/2005 | Akase | |
| 2005/0062721 A1 | 3/2005 | Hsu et al. | 345/166 |
| 2005/0068300 A1 | 3/2005 | Wang et al. | 345/166 |
| 2006/0012660 A1 | 1/2006 | Dagborn | |
| 2006/0061647 A1 | 3/2006 | Breton | |
| 2006/0165460 A1 | 7/2006 | Breton | |
| 2007/0009277 A1 | 1/2007 | Shoen | |
| 2007/0076082 A1 | 4/2007 | Cook | |
| 2007/0120937 A1 | 5/2007 | Ahne et al. | |
| 2007/0139507 A1 | 6/2007 | Ahne et al. | |
| 2007/0150194 A1 | 6/2007 | Chirikov | 701/220 |
| 2008/0007762 A1 | 1/2008 | Robertson et al. | |
| 2008/0144053 A1 | 6/2008 | Gudan et al. | |
| 2008/0204770 A1 | 8/2008 | Bledsoe et al. | |
| 2008/0212120 A1 | 9/2008 | Mealy et al. | |
| 2009/0034018 A1 | 2/2009 | Lapstun et al. | |
| 2009/0141112 A1 | 6/2009 | Bergman et al. | |
| 2009/0279148 A1 | 11/2009 | Lapstun et al. | |
| 2010/0039669 A1 | 2/2010 | Chang et al. | |
| 2010/0231633 A1 | 9/2010 | Lapstun et al. | |

FOREIGN PATENT DOCUMENTS

| | | |
|---|---|---|
| EP | 1209574 A2 | 5/2002 |
| EP | 1227432 A1 | 7/2002 |
| JP | 08142584 A | 6/1996 |
| JP | 09300712 A | 11/1997 |
| JP | 11069100 A | 3/1999 |
| JP | 2002205387 A | 7/2002 |
| JP | 2004106339 A | 4/2004 |
| WO | WO 03/076196 A1 | 9/2003 |
| WO | WO 2004/088576 A1 | 10/2004 |
| WO | WO2005070684 A1 | 8/2005 |

OTHER PUBLICATIONS

U.S. Appl. No. 11/955,209, filed Dec. 12, 2007, Bledsoe et al.
U.S. Appl. No. 11/955,240, filed Dec. 12, 2007, Bledsoe et al.
U.S. Appl. No. 11/955,258, filed Dec. 12, 2007, Simmons et al.
U.S. Appl. No. 11/955,228, filed Dec. 12, 2007, Bledsoe et al.
U.S. Appl. No. 11/968,528, filed Jan. 2, 2008, Simmons et al.
U.S. Appl. No. 11/972,462, filed Jan. 2, 2008, Simmons et al.
U.S. Appl. No. 12/013,313, filed Jan. 11, 2008, Bledsoe et al.
U.S. Appl. No. 12/016,833, filed Jan. 18, 2008, Simmons et al.
U.S. Appl. No. 12/037,045, filed Feb. 25, 2008, Bledsoe et al.
U.S. Appl. No. 12/036,996, filed Feb. 25, 2008, Bledsoe et al.
U.S. Appl. No. 12/037,029, filed Feb. 25, 2008, Bledsoe et al.
U.S. Appl. No. 12/038,660, filed Feb. 27, 2008, McKinley et al.
U.S. Appl. No. 12/041,496, filed Mar. 8, 2008, Mealy et al.
U.S. Appl. No. 12/041,515, filed Mar. 3, 2008, Mealy et al.
U.S. Appl. No. 12/041,535, filed Mar. 3, 2008, Mealy et al.
U.S. Appl. No. 12/062,472, filed Apr. 3, 2008, McKinley et al.
U.S. Appl. No. 11/955,240, filed Dec. 12, 2007, Bledsoe et al., "Image Translation Device for a Mobile Device," 42 pages.
U.S. Appl. No. 11/955,258, filed Dec. 12, 2007, Simmons, et al., "Printer for a Mobile Device," 37 pages.
U.S. Appl. No. 11/959,027, filed Dec. 18, 2007, Simmons et al., "Ergonomic Design for a Handheld Image Translation Device," 25 pages.
U.S. Appl. No. 11/968,528, filed Jan. 2, 2008, Simmons et al., "Determining End of Print Job in Handheld Image Translation Device," 45 pages.
U.S. Appl. No. 11/972,462, filed Jan. 10, 2008, Simmons et al., "Usage Maps in Image Deposition Devices," 39 pages.
U.S. Appl. No. 12/013,313, filed Jan. 11, 2008, Bledsoe et al., "Adaptive Filtering Scheme in Handheld Positioning Device," 38 pages.
U.S. Appl. No. 12/016,833, filed Jan. 18, 2008, Simmons et al., "Sensor Positioning in Handheld Image Translation Device," 39 pages.
U.S. Appl. No. 12/036,996, filed Feb. 25, 2008, Bledsoe et al., "Determining Positioning of a Handheld Image Translation Device," 41 pages.
U.S. Appl. No. 12/037,029, filed Feb. 25, 2008, Bledsoe et al., "Definition of Print Image for Image Translation Device," 36 pages.
U.S. Appl. No. 12/037,043, filed Feb. 25, 2008, Bledsoe et al., "Bit Selection from Print in Image Transalation Device," 43 pages.
U.S. Appl. No. 12/037,045, filed Feb. 25, 2008, Seubert, "Active Immunization to Generate Antibodies to Soluable A-Beta," 45 pages.
U.S. Appl. No. 12/038,660, filed Feb. 27, 2008, McKinley et al., "Providing User Feedback in Handheld Device," 40 pages.
U.S. Appl. No. 12/041,496, filed Mar. 3, 208, Mealy, "Handheld Image Translation Device," 40 pages.
U.S. Appl. No. 12/041,515, filed Mar. 3, 2008, Mealy et al., "Position Correction in Handheld Translation Device," 42 pages.
U.S. Appl. No. 12/041,535, filed Mar. 3, 2008, Mealy et al., "Dynamic Image Dithering,".
U.S. Appl. No. 12/062,472, filed Apr. 3, 2008, McKinley et al., "Image Translation Device Providing Navigational Data Feedback to communication Device," 39 pages.
U.S. Appl. No. 12/188,056, filed Aug. 7, 2008, Mealy et al., "Controlling a Plurality of Nozzles of a Handheld Printer," 47 pages.
Fairchild, "IEEE 1284 Interface Design Solutions", Jul. 1999, Fairchild Semiconductor, AN-5010, 10 pages.
Texas Instruments, "Program and Data Memory Controller", Sep. 2004, SPRU577A, 115 pages.
U.S. Appl. No. 11/955,209, filed Dec. 12, 2007, Bledsoe, et al "Printing on Planar or Non-Planar Print Survace with Handhel Printing Device", 51 pages.
U.S. Appl. No. 11/955,228, filed Dec. 12, 2007, Bledsoe et al., "Scanner for a Mobile Device", 34 pages.

* cited by examiner

TRACKING A POSITION IN RELATION TO A SURFACE

RELATED APPLICATION

The present application claims the benefit of priority of U.S. Provisional Application No. 60/882,771, filed Dec. 29, 2007, entitled "Improving Dead Reckoning Through Use of Multiple Optical Sensors." This provisional application is expressly incorporated herein by reference in its entirety.

TECHNICAL FIELD

This invention generally relates to tracking a position of an object in relation to a surface.

BACKGROUND

A position of an object may be tracked in relation to a surface for various applications. Relative to a known position of the object, a subsequent position of the object can be determined by sensing local features in the surface as the object is moved in relation to the surface.

In one example relating to a personal computer or other console, a tracking device is implemented in an optical mouse to enable a human user to input relative changes in position to a personal computer or other console by moving the mouse. The mouse is moved across a surface, such as a mousepad, that has local differences in color or texture. The tracking device may include a light-emitting diode (LED) to illuminate a predetermined area of the surface. An optical sensor may detect positions of the local differences within the illuminated area at a first point in time, and then again at a second point in time. The tracking device determines a relative shift of the local differences between the first and second time points to determine a two-dimensional movement of the mouse across the surface.

The optical sensor may be controlled to detect the surface at a sufficiently high frequency to determine typical two-dimensional movements of the object across a typical surface. However, the optical sensor may also have a characteristic maximum frequency of operation. Thus, the object may be moved sufficiently fast that a movement between periodic differences in the surface, or between two consecutive detection times, exceeds a dimension of the predetermined area of detection. Moreover, if the tracking device is not successful at detecting a movement at one time point, then it may have to wait until a subsequent time point to attempt to detect the movement. By waiting to detect the movement, the tracking device may lose information about the movement between consecutive, successful detection time points. These environmental factors can cause inaccuracies in the determination of the movement of the object.

In addition, the tracking device may not be able to detect rotations of the object in relation to the surface. For example, the optical sensor may output the detected magnitude of a movement along a first ("x") axis and the detected magnitude of a movement along a second ("y") axis that is orthogonal to the first axis. However, a rotation of the object may not cause any detectable movement of the optical sensor along the 'x' axis or the 'y' axis. Even if the rotation causes a detectable movement of the optical sensor, the tracking device may not be able to determine a magnitude or direction of the rotation based on the detectable movement. The tracking device may therefore be unable to determine a rotation of the object relative to the surface.

Thus, it is desirable to more accurately track a position of an object. It is further desirable to track the position of the object with improved robustness to environmental factors. Moreover, it is desirable to detect rotations of the object in relation to the surface.

SUMMARY

A tracking device is provided for tracking a position of the tracking device in relation to a surface. The tracking device comprises a first sensor to capture a primary image of a surface and a second sensor to capture a secondary image of the surface. One or more processors are provided to evaluate the primary and secondary images to determine a movement of the tracking device in relation to the surface.

In another aspect, a tracking device is provided for tracking a position of the tracking device in relation to a surface. The tracking device comprises a first optical sensor to capture a primary image of a surface at a first time and at a second time. The tracking device further comprises a second optical sensor to capture a secondary image of the surface at a third time and at a fourth time. In addition, the tracking device comprises one or more processors to perform the following to determine a movement of the tracking device in relation to the surface: (i) compare the primary image captured at the second time to the primary image captured at the first time to determine a displacement of the first optical sensor in a first dimension and a displacement of the first optical sensor in a second dimension that is different from the first dimension, and (ii) compare the secondary image captured at the fourth time to the secondary image captured at the third time to determine a displacement of the second optical sensor in the first dimension and a displacement of the second optical sensor in the second dimension.

In yet another aspect, a method is provided of tracking a position of an object in relation to a surface. The method comprises, at the object, capturing a primary image of a surface and capturing a secondary image of the surface. The method further comprises evaluating the primary and secondary images to determine a movement of the object in relation to the surface.

BRIEF DESCRIPTION OF THE DRAWINGS

The accompanying drawings, which are incorporated in and constitute a part of this specification, illustrate embodiments consistent with the present invention and, together with the description, serve to explain advantages and principles of the invention. In the drawings.

DESCRIPTION OF THE EMBODIMENTS

Reference will now be made in detail to embodiments consistent with the present invention, examples of which are illustrated in the accompanying drawings. Wherever possible, the same reference numbers will be used throughout the drawings to refer to the same or like parts.

A tracking device is provided for tracking a position in relation to a surface. The tracking device may detect changes in position that include displacements in location and rotations that result in a changed angular orientation relative to the surface. By detecting these movements, the tracking device can determine the approximate position of the tracking device relative to an earlier known position.

Figure 1:
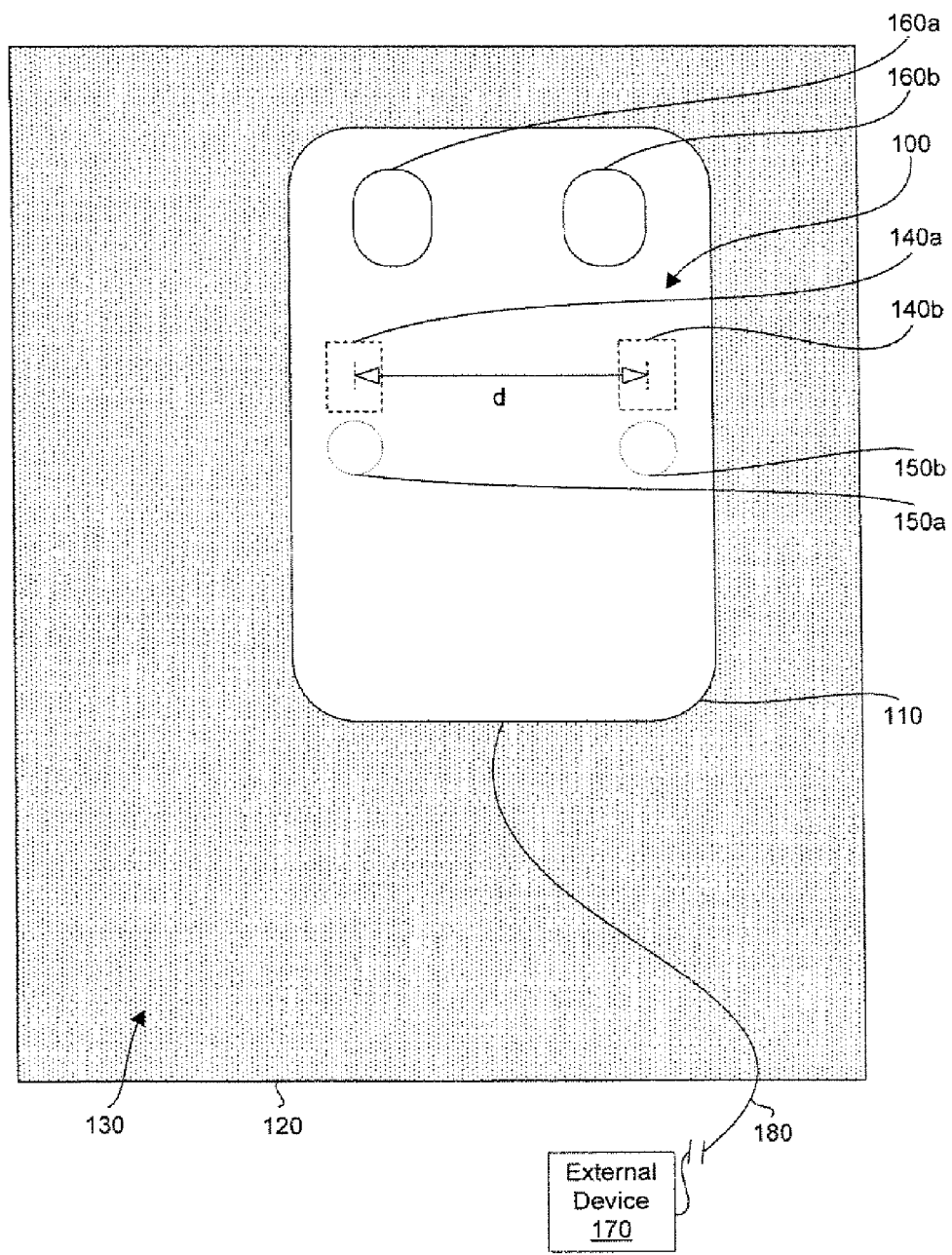
FIG. 1 is a schematic diagram of an exemplary embodiment, consistent with the present invention, of a tracking device having first and second optical sensors.

FIG. 1 is a schematic diagram of an exemplary embodiment of a tracking device 100. Tracking device 100 is provided only to illustrate an exemplary embodiment consistent with the present invention, and should not be used to limit the scope of the invention or its equivalents to the exemplary embodiments provided herein.

Tracking device 100 may be implemented in an object 110 to track the position of object 110 in relation to a surface 120. For example, tracking device 100 may be implemented in object 110 such that object 110 forms an input device (as shown in FIG. 1), a distance-measuring device, or a device adapted for another purpose related to tracking a position. The input device may include, for example, a computer mouse, a trackball, a device for inputting drawing or writing by hand, or a monitoring device that can be attached to a target object to track the position of the target object. In an exemplary embodiment, the object 110 forms a handheld printer that includes an inkjet print head to print a pattern on a surface according to the tracked position of object 110 in relation to the surface.

The movement of tracking device 100 may be expressed as a present position of tracking device 100 in relation to a position of tracking device 100 at a time before the movement. If the position of tracking device 100 before the movement is known relative to an external reference frame, then the current position of tracking device 100 may also be determined relative to the external reference frame. For example, tracking device 100 may be adapted to be initialized at an initial position that is used as a reference position by tracking device 100. If tracking device 100 is implemented in object 110, or is otherwise disposed in a known positional relationship to object 110, tracking device 100 may also track the position of object 110 in relation to surface 120.

Surface 120 may have features 130 that can be detected by optical sensors. Features 130 may be located at substantially periodic intervals or substantially aperiodically, such as substantially randomly. Surface 120 may be shaped approximately two-dimensionally (i.e., approximately flat). For example, surface 120 may be an exposed surface of a mouse pad. Alternatively, surface 120 may be shaped substantially three-dimensionally (i.e., substantially non-flat). For example, surface 120 may be textured, curve smoothly, or bend at a kink. In yet another example, surface 120 may be an exposed surface of a perforated layer of material, such as for example one side of a mesh of material.

Tracking device 100 may include a plurality of optical sensors 140a, 140b to capture images of surface 120 at selected points in time. Upon activation, optical sensors 140a, 140b may generate the images based on electromagnetic radiation that optical sensors 140a, 140b detect from features 130 at one or more wavelengths. For example, optical sensors 140a, 140b may detect positions of features 130 based on emissions or reflections of light from features 130 at visible, infrared, or other wavelengths. Optical sensors 140a, 140b may capture images that are two-dimensional to represent features 130 across two orthogonal dimensions. The images may further include data in additional dimensions. Alternatively, optical sensors 140a, 140b may capture one-dimensional images that represent features 130 across one dimension.

One or more of optical sensors 140a, 140b may be disposed such that the dimensions of the images captured by optical sensors 140a, 140b are not parallel to predetermined dimensions along which tracking device 100 is commonly moved. Such placement of optical sensors 140a, 140b may enable positional changes along these dimensions of common movement to be registered along a plurality of the dimensions of the images captured by optical sensors 140a, 140b. Tracking device 100 may thus be able to track its position with a higher degree of accuracy during typical use. For example, one or more of optical sensors 140a, 140b may be disposed such that the dimensions of the images captured by optical sensors 140a, 140b are at an angle of from about 30 to about 60 degrees in relation to a predetermined dimension along which tracking device 100 is often moved. In an exemplary embodiment, one or more of optical sensors 140a, 140b may be disposed such that its captured images have a dimension that is at an angle of about 45 degrees relative to a dimension of common movement of tracking device 100.

Furthermore, one or more of optical sensors 140a, 140b may be implemented as an integrated circuit (IC). The IC may incorporate very large scale integration (VLSI) or ultra large scale integration (ULSI), indicating the degree of spatial density of transistors in a single IC. Typically, the IC is incorporated into a monolithic structure, such as a semiconductor "chip." For example, one or more of optical sensors 140a, 140b may include an ADNS-3080 optical mouse sensor, available from Avago Technologies Limited, San Jose, Calif.

In an exemplary embodiment, tracking device 100 may have a first optical sensor 140a to capture a first image of surface 120 and a second optical sensor 140b to capture a second image of surface 120. In FIG. 1, first optical sensor 140a and second optical sensor 140b are disposed such that a center point of first optical sensor 140a is separated by a distance 'd' from a center point of second optical sensor 140b. For example, the first and second optical sensors 140a, 140b may be disposed to have a distance 'd' between their respective center points of at least about 5 cm to obtain information about surface 120 from sufficiently distant locations. Tracking device 100 may include additional optical sensors (not shown) such that more than two sensors in total are provided.

First and second optical sensors 140a, 140b may be adapted to repeatedly capture the images of surface 120 at sequential points in time. For example, a clock may be provided to supply a periodic clock signal that activates one or more of optical sensors 140a, 140b to capture an image at each of multiple periodic time points. In an exemplary embodiment, the clock and optical sensors 140a, 140b may be adapted to capture the images at a periodic rate of from about 4000 to about 10,000 frames per second (fps). For example, the clock and optical sensors 140a, 140b may be adapted to capture the images at a rate of about 6400 fps.

One or more illuminators 150a, 150b may be provided to illuminate one or more areas of surface 120 that may be at predetermined positions relative to illuminators 150a, 150b illuminators 150a, 150b may be provided to illuminate surface 120 at one or more wavelengths selected to be detected by optical sensors 140a, 140b. In an exemplary embodiment, illuminators 150a, 150b may be adapted to provide light at a wavelength range that includes the visible wavelength of 639 nm such that reflections be detected by optical sensors 140a, 140b at substantially the same wavelength. Illuminators 150a, 150b may include electromagnetic radiation sources, such as for example light-emitting diodes (LEDs), laser sources, incandescent bulbs, reflectors, optically-transmissive conduits, or other suitable components for delivering a field of electromagnetic radiation onto the predetermined areas of surface 120 in relation to tracking device 100 illuminators 150a, 150b may also have one or more light-shaping or light-directing components, such as for example lenses, mirrors, or optically-transmissive conduits, to further shape or direct the radiation field onto the predetermined areas of surface 120. In an exemplary embodiment, one or more of Illuminators 150a, 150b may include an HLMP-ED80 LED illumination source and an ADNS-2120 lens, both available from Avago Technologies Limited, San Jose, Calif.

In another exemplary embodiment, one or more of illuminators 150a, 150b may include laser sources in addition to one or more light-shaping or light-directing components to deliver a laser beam at a predetermined wavelength. Optical sensors 140a, 140b may be laser sensors that are adapted to detect the laser beam after the laser beam has reflected from surface 120. Implementing optical sensors 140a, 140b and illuminators 150a, 150b to use a laser beam may enable the images of surface 120 to be captured at one or more of a higher resolution and a higher capture rate than with non-laser electromagnetic radiation sources.

One or more processors may be provided to evaluate the first and second images from optical sensors 140a, 140b to determine a movement of tracking device 100 in relation to surface 120. "Determining a movement" refers to determining a value of a property of the movement of tracking device 100 in relation to surface 120. For example, determining the value of the property may include determining a magnitude of a displacement of tracking device 100, a magnitude of a rotation of tracking device 100, or a point of rotation of tracking device 100.

In an exemplary embodiment, the processors may be adapted to compare a frame of an image captured at one time point by first optical sensor 140a to a frame of the image captured at a subsequent time point by first optical sensor 140a. Based on this first comparison, the processors may determine a displacement of first optical sensor 140a in a first dimension and a displacement of the first optical sensor in a second dimension that is orthogonal to the first dimension. The processors may also be adapted to compare a frame of an image captured at one time point by second optical sensor 140a to a frame of the image captured at a subsequent time point by second optical sensor 140b. Based on this second comparison, the processors may determine a displacement of second optical sensor 140b in the first dimension and a displacement of second optical sensor 140b in the second dimension. The processors may further evaluate these determined displacement values corresponding to optical sensors 140a, 140b to determine one or more movements of tracking device 100.

Tracking device 100 may further include one or more of an accelerometer and a gyroscope to determine movement in one or more dimensions. For example, the accelerometers and gyroscopes may be implemented in dimensions in which movement is not tracked by optical sensors 140a, 140b, or the accelerometers and gyroscopes may be implemented to provide additional information about movement in the same dimensions as optical sensors 140a, 140b. The processors may be adapted to process data from the accelerometers and gyroscopes to determine information about movement of tracking device 100.

In addition, tracking device 100 may include one or more mechanical input components. For example, if tracking device 100 is implemented in a computer mouse or trackball, then tracking device 100 may include one or more buttons or scroll wheels. In FIG. 1, tracking device 100 is shown as having a first button 160a and a second button 160b. First and second buttons 160a, 160b may be coupled to one or more of the processors. Tracking device 100 may further include one or more mechanical output components, such as for example a vibration-generating component or sound-producing component.

Tracking device 100 may transmit one or more signals to an external device 170 over a signal coupler 180. The signals may describe the movement of tracking device 100 in one or more dimensions. External component 170 may include, for example, a personal computer, a game console, or a display. Signal coupler 180 may transmit signals as digital signals or as analog signals. Signal coupler 180 may include an electrical conductor, optical transmitter and receiver, radio frequency (RF) transmitter and receiver, or any other suitable coupling for transmitting information from one location to another location. For example, signal coupler 180 may include an electrical RS-232 interface, Universal Serial Bus (USB) interface, PS/2 interface, or Bluetooth® interface.

Figure 2:
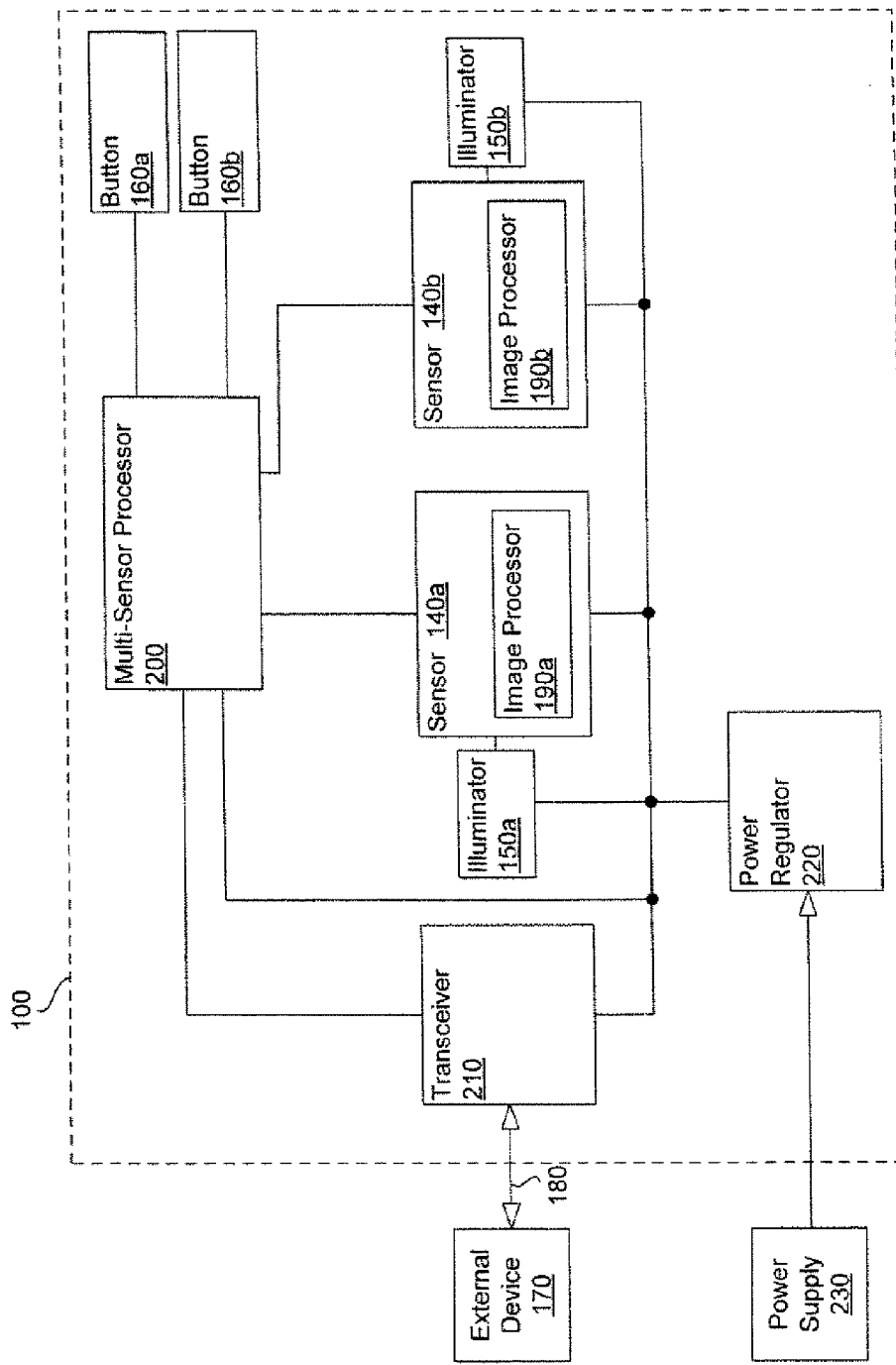
FIG. 2 is a block diagram of an exemplary embodiment, consistent with the present invention, of electronic circuitry implementing a tracking device.

FIG. 2 is a block diagram of electronic circuitry that may implement tracking device 100. Each of the lines connecting electronic components in FIG. 2 represents one or more electrical couplings between those electronic components. Additional electronic components or electrical couplings that are not shown in FIG. 2 may be used in the electronic circuitry to implement tracking device 100, as would be understood by one of ordinary skill in the art. For example, the electronic circuitry may incorporate one or more oscillators, diodes, capacitors, resistors, field-effect transistors (FETs), jumpers, and sockets or other connectors to implement tracking device 100. The electronic components and electrical couplings shown in FIG. 2 are provided only to illustrate the invention, and should not be used to limit the scope of the invention or its equivalents to the exemplary embodiments provided herein.

Optical sensors 140a, 140b are provided to capture images of predetermined areas of surface 120. Illuminators 150a, 150b may be coupled to respective optical sensors 140a, 140b. For example, first illuminator 150a may be coupled to first optical sensor 140a while second illuminator 150b may be coupled to second optical sensor 140b. Each of optical sensors 140a, 140b may activate its respective illuminator 150a, 150b while the optical sensor is capturing an image of the area of surface 120 illuminated by the activated illuminator.

In an exemplary embodiment, one of the processors described above may be implemented in each of optical sensors 140a, 140b as image processors 190a, 190b, respectively. Each of image processors 190a, 190b may compare subsequent images captured by its respective optical sensor. Image processors 190a, 190b may be digital signal processors (DSPs) embedded in optical sensors 140a, 140b. Image processors 190a, 190b may use these image comparisons to determine one or more movements of the respective optical sensors in relation to surface 120. In an exemplary embodiment, image processor 190a, 190b at each of optical sensors 140a, 140b determines a first displacement magnitude in a first dimension and a second displacement magnitude in a second dimension that is orthogonal to the first dimension.

For example, the first dimension may be a left-right dimension across a surface while the second dimension is a back-and-forth dimension across the same surface.

The processors of tracking device 100 may also include a multi-sensor processor 200 to receive signals from first and second optical sensors 140a, 140b and further evaluate these signals to determine a movement of tracking device 100 in relation to surface 120. Optical sensors 140a, 140b may be communicatively coupled to multi-sensor processor 200 to transmit information related to the captured images to multi-sensor processor 200. For example, optical sensors 140a, 140b may transmit the magnitudes of movements of respective optical sensors 140a, 140b in relation to surface 120, as determined by image processors 190a, 190b, to multi-sensor processor 200. In an exemplary embodiment, multi-sensor processor 200 may include an 8-bit PIC family microcontroller, available from Microchip Technology, Inc., Chandler, Ariz. In an exemplary embodiment, multi-sensor processor 200 includes a PIC18F2620 microcontroller, available from Microchip Technology, Inc.

In an exemplary embodiment, each of first and second optical sensors 140a, 140b may output a magnitude of a displacement in the first dimension and a magnitude of a displacement in the second dimension. Multi-sensor processor 200 may receive signals indicating these magnitudes for each of first and second optical sensors 140a, 140b. Multi-sensor processor 200 may process these magnitudes to determine one or more movements of tracking device 100 in one or more dimensions.

Multi-sensor processor 200 may be adapted to determine whether information related to an image captured by one of first and second optical sensors 140a, 140b is sufficiently reliable to determine the movement of tracking device 100. If the information is not sufficiently reliable, multi-sensor processor 200 may evaluate information related to the other one of first and second optical sensors 140a, 140b to determine the movement of the tracking device absent further evaluation of the information related to the presently-unreliable optical sensor. If information is not available for the other one of optical sensors 140a, 140b at a current time point, multi-sensor processor 200 may wait to receive information for that optical sensor at a future time point. By redundantly using information from multiple optical sensors 140a, 140b, tracking device 100 may be capable of tracking its relative position with substantial accuracy despite unreliable information from one or more of individual optical sensors 140a, 140b. Thus, tracking device 100 may be substantially robust to environmental factors that can cause information related to the image from one of optical sensors 140a, 140b to be unreliable. These environmental factors may include, for example, a problematic speed with which the mouse may be moved, a periodicity of features of surface 120 or a substantial absence of features 130 of surface, or dust or other impurities that may degrade the accuracy of an image that is captured of surface 120.

Processors 190a, 190b, and 150 may be implemented in tracking device 100, or one or more of processors 190a, 190b, and 150 may alternatively be implemented external to tracking device 100, such as in a remote processing center. The functions of processors 190a, 190b, and 150 may be implemented together or separately, and as part of one or more physical components, as would be suitable for the desired application. For example, tasks described herein as performed by image processors 190, 190b may alternatively be performed by multi-sensor processor 200, or vice versa. The functions of processors 190a, 190b, and 150 may also be implemented in hardware, software, firmware, or a suitable combination thereof.

A transceiver 210 may be provided to communicatively couple tracking device 100 to external device 170 to enable communication between tracking device 100 and external device 170. For example, transceiver 210 may communicatively couple multi-sensor processor 200 to external device 170. Transceiver 210 may output a signal that indicates the movement of tracking device 100 as determined by processors 190a, 190b, and 150. Transceiver 210 may adapt electrical voltage or current levels of signals received from multi-sensor processor 200 to be compatible with a receiver at external device 170, such as a transceiver at external device 170. In an exemplary embodiment, transceiver 210 may include a MAX3233EEWP transceiver, available from Maxim Integrated Products, Inc., Sunnyvale, Calif.

A power regulator 220 may be provided to receive and regulate power from a power supply 230 to deliver regulated power to one or more electrical components that implement tracking device 100. For example, power regulator 220 may be coupled to one or more of optical sensors 140a, 140b, illuminators 150a, 150b, multi-sensor processor 200, and transceiver 210 to provide a regulated voltage to these components. Power regulator 220 may be incorporated into object 110 together with the rest of tracking device 100. Alternatively, power regulator 220 may be disposed external to object 110. Power regulator 220 may include a low-dropout (LDO) linear regulator. In an exemplary embodiment, power regulator 220 may include a LT® 1763 series regulator, available from Linear Technology, Milpitas, Calif.

Figure 3:
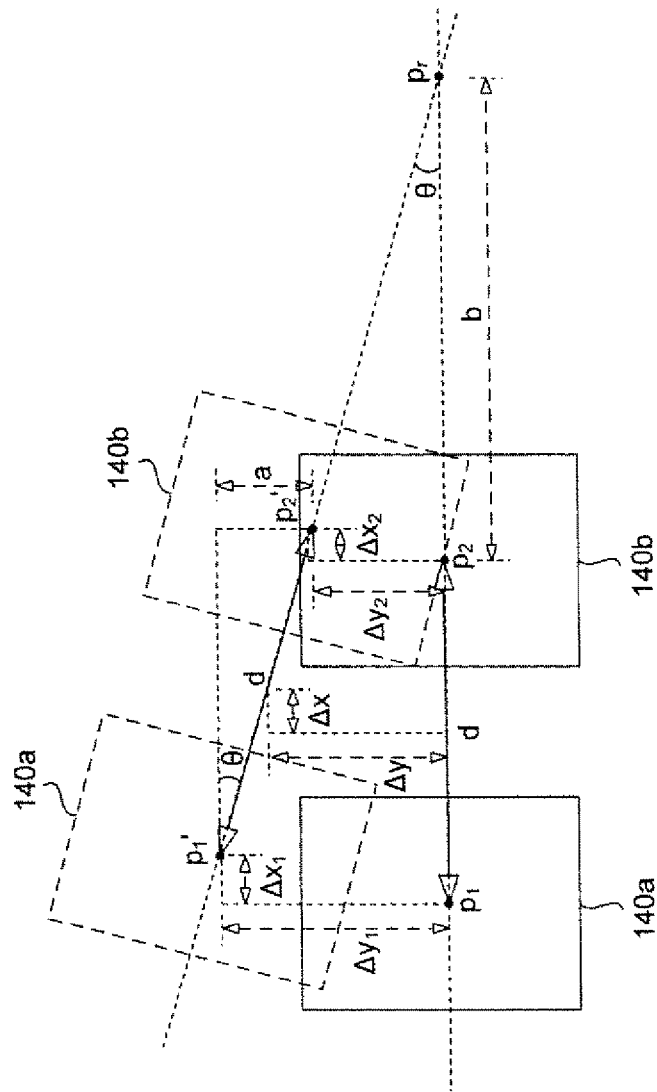
FIG. 3 is a schematic diagram of an exemplary embodiment, consistent with the present invention, of first and second optical sensors at a first set of positions and then at a second set of positions.

FIG. 3 is a schematic diagram of first and second optical sensors 140a, 140b of tracking device 100 at first respective positions (shown as $p_1$ and $p_2$) and subsequently at second respective positions (shown as $p_1'$ and $p_2'$). At the first respective positions, first and second optical sensors 140a, 140b are indicated by solid lines. At the later, second, respective positions, first and second optical sensors 140a, 140b are indicated by dashed lines. Tracking device 100, as a unit, has been moved in a first dimension (shown in FIG. 3 as the horizontal direction) by a magnitude labeled as '$\Delta x$', and in a second dimension (shown as the vertical direction) that is orthogonal to the first dimension by a magnitude labeled as '$\Delta y$'. FIG. 3 shows tracking device 100 as having been displaced to the right by an amount '$\Delta x$', and upward by an amount '$\Delta y$'.

In an exemplary embodiment, first and second optical sensors 140a, 140b may determine displacement magnitudes '$\Delta x_1, \Delta x_2$' of first and second optical sensors 140a, 140b, respectively, in the first dimension. First and second optical sensors 140a, 140b may also determine the displacement magnitudes '$\Delta y_1, \Delta y_2$' of first and second optical sensors 140a, 140b, respectively, in the second dimension. First and second optical sensors 140a, 140b may transmit these magnitudes to multi-sensor processor 200. Based on these displacement magnitudes, multi-sensor processor 200 may use predefined mathematical relationships to determine properties of the movement of tracking device 100.

The displacement amount '$\Delta x$' may be calculated by averaging the displacement magnitudes '$\Delta x_1, \Delta x_2$' of first and second optical sensors 140a, 140b, respectively, in the first dimension. The displacement amount '$\Delta y$' may be calculated by averaging the displacement magnitudes '$\Delta y_1, \Delta y_2$' of first and second optical sensors 140a, 140b, respectively, in the second dimension. For example, multi-sensor processor 200 may calculate the displacement amounts '$\Delta x$' and '$\Delta y$' based on the received information according to Equations 1 and 2:

$$\Delta x = \frac{\Delta x_1 - \Delta x_2}{2} \quad (1)$$

$$\Delta y = \frac{\Delta y_1 - \Delta y_2}{2} \quad (2)$$

In addition to displacements in the first and second dimensions, tracking device 100 may exhibit rotations about one or more axes. Optical sensors 140a, 140b of tracking device 100 are shown in FIG. 3 as having been rotated clockwise by an amount 'θ', about an axis orthogonal to the first and second dimensions (horizontal and vertical dimensions in FIG. 3), between the first respective positions ($p_1$ and $p_2$) and the second respective positions ($p_1'$ and $p_2'$). Multi-sensor processor 200 (FIG. 2) may use predefined mathematical relationships to determine a magnitude of rotation between the first respective positions ($p_1$ and $p_2$) and the second respective positions ($p_1'$ and $p_2'$) of tracking device 100 based on the information received from first and second optical sensors 140a, 140b. Multi-sensor processor 200 may use trigonometric rules pertaining to right triangles to calculate the magnitude of rotation. For example, multi-sensor processor 200 may calculate a magnitude of clockwise rotation 'θ' of tracking device 100 according to Equation 3, where the value of 'a' is defined by Equation 4:

$$\theta = \sin^{-1}\left(\frac{a}{d}\right) \quad (3)$$

$$a = \Delta y_1 - \Delta y_2 \quad (4)$$

Increasing the distance 'd' between the center points of first and second optical sensors 140a, 140b may provide a proportionately larger value of 'a' for the same actual value of the rotation magnitude 'θ'. Thus, increasing the distance 'd' may increase the accuracy with which the rotation magnitude 'θ' can be determined.

In addition, multi-sensor processor 200 may determine a point about which the tracking device 100 has been rotated, based on the information received from first and second optical sensors 140a, 140b. In FIG. 3, a point of rotation is shown as '$p_r$'. The point of rotation '$p_r$' and the first position '$p_2$' of second optical sensor 140b are shown in FIG. 3 as separated by a distance 'b'. Using trigonometric rules, the distance 'b' may be calculated according to Equation 5:

$$b = \Delta y_2 \cdot \cot^{-1}\theta \quad (5)$$

The point of rotation '$p_r$' may therefore be calculated relative to the first position '$p_2$' of second optical sensor 140b. Since the location of first optical sensor 140a may be known relative to the location of second optical sensor 140b, the point of rotation '$p_r$' may also be calculated relative to the first position '$p_1$' of first optical sensor 140a. Tracking device 100 may be rotated about one or more axes. For example, tracking device 100 may be rotated about two or three orthogonal axes. Tracking device 100 may also be adapted to determine a magnitude of rotation and point of rotation corresponding to each of these axes.

Figure 4A:
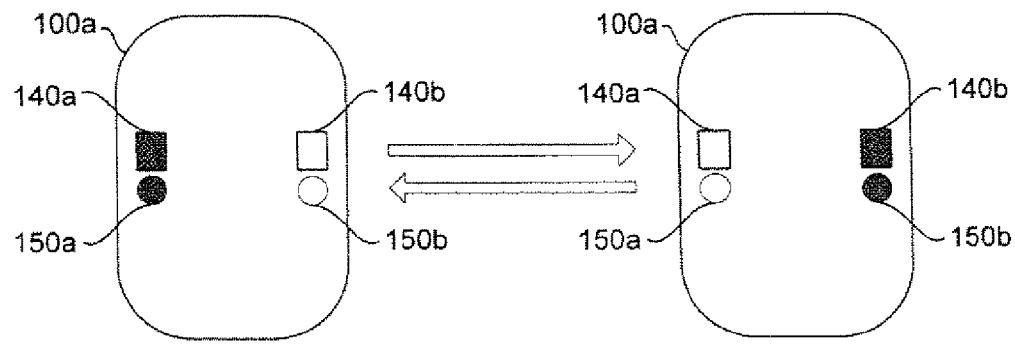
FIG. 4a is a schematic diagram of an exemplary embodiment, consistent with the present invention, of a tracking device during different phases of a sequence in which first and second optical sensors are alternately activated.

FIG. 4a is a schematic diagram of an exemplary embodiment of a tracking device 100a during different phases of a sequence in which first and second optical sensors 140a, 140b are alternately activated to track a position in relation to a surface. Active sensors are shown as cross-hatched, while inactive sensors are shown without hatching. Arrows point in the time order of the phases for this exemplary embodiment.

As shown in FIG. 4a, first optical sensor 140a may be activated to capture an image while second optical sensor 140b is deactivated at a first point in time. At a second, subsequent point in time, first optical sensor 140a may be deactivated and second optical sensor 140b may be activated. At a third point in time, subsequent to the second time, second optical sensor 140b may again be deactivated and first optical sensor 140a may again be activated, just as in the first time point. This cycle may be repeated at a predetermined rate to continuously determine movements of tracking device 100a.

In the exemplary embodiment of FIG. 4a, first and second optical sensors 140a, 140b are activated at substantially the same rates to capture respective images at this rate. However, first optical sensor 140a is activated while second optical sensor 140b is deactivated, and vice versa, such that first optical sensor 140a captures frames of a primary image in a phase-shifted relationship to second optical sensor 140b capturing frames of a secondary image. In this example, the times at which frames of the primary image are captured are interlaced with the times at which the frames of the secondary image are captured.

Figure 4B:
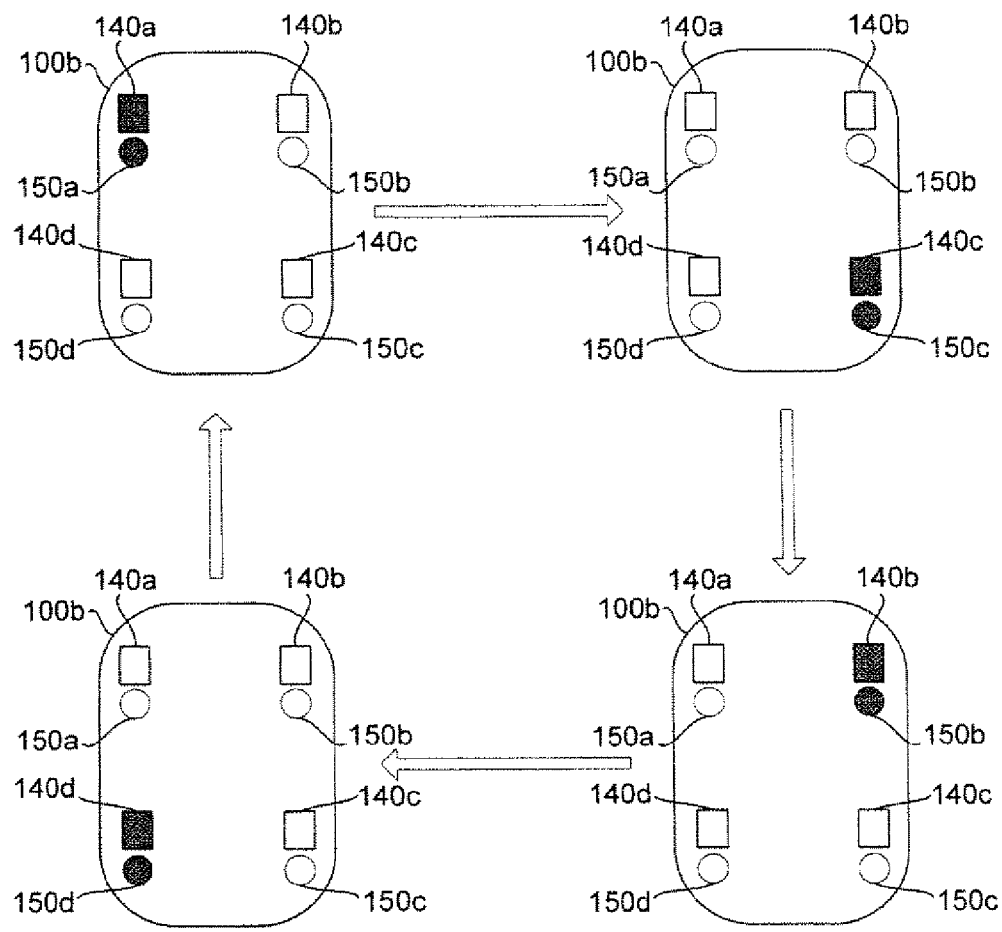
FIG. 4b is a schematic diagram of an exemplary embodiment, consistent with the present invention, of a tracking device during different phases of a sequence in which first, second, third, and fourth optical sensors are alternately activated.

FIG. 4b is a schematic diagram of an exemplary embodiment of a tracking device 100b in a sequence of activating first, second, third, and fourth optical sensors 140a-140d to track a position in relation to a surface. As shown in FIG. 4b, first optical sensor 140a may be activated while second, third, and fourth optical sensors 140b-140d are inactive at a first point in time. At a second, subsequent point in time, first optical sensor 140a may be deactivated and fourth optical sensor 140d may be activated. At a third point in time, subsequent to the second time point, fourth optical sensor 140d may be deactivated and second optical sensor 140b may be activated. At a fourth point in time, subsequent to the third time point, second optical sensor 140b may be deactivated and third optical sensor 140c may be activated. At a fifth point in time, subsequent to the fourth time point, third optical sensor 140c may be deactivated and first optical sensor 140a may again be activated, just as in the first time point. This cycle may be repeated at a predetermined rate to continuously determine movements of tracking device 100b.

Examples are described in which optical sensors 140a-140d are alternately activated such that one of optical sensors 140a-140d is activated while the remaining optical sensors are deactivated. In these examples, the times during which the different optical sensors 140a-140d are activated may be interlaced. Alternating activation times may be used to increase an effective frame rate of tracking device 100, and thereby improve the robustness of positional tracking to environmental conditions, without necessitating an increase in the frequency of a clock signal provided to optical sensors 140a-140d. In an exemplary embodiment, the effective frame rate is approximately proportionate to the number of optical sensors 140a-140d implemented in tracking device 100. Thus, using multiple optical sensors may enable multi-sensor processor 200 to determine the position of tracking device 100 at a rate that is at least about twice a rate at which one of the optical sensors is activated.

However, other embodiments may be implemented to suit particular applications. For example, two or more of optical sensors 140a-140d may be activated during times that substantially coincide. Selecting activation times that substantially coincide may improve the accuracy of determining a magnitude of rotation of tracking device 100b.

As explained above, a tracking device consistent with the present invention may improve the accuracy of tracking a position of the tracking device in relation to a surface. The tracking device may also track its position with increased robustness to environmental circumstances. Moreover, the tracking device may be adapted to detect rotations in relation to the surface.

Although embodiments consistent with the present invention have been described in considerable detail with regard to embodiments thereof, other versions are possible. For example, the tracking device may comprise other electronic structures equivalent in function to the illustrative structures herein. Furthermore, relative or positional terms, such as "first," "second," "third," and "fourth," are used with respect to the exemplary embodiments and are interchangeable. Therefore, the appended claims should not be limited to the description of the versions contained herein.

What is claimed is:

1. A tracking device for tracking a position of the tracking device in relation to a surface, the tracking device comprising:
    (i) a first optical sensor disposed near a first corner of the tracking device, (ii) a second optical sensor disposed near a second corner of the tracking device, (iii) a third optical sensor disposed near a third corner of the tracking device, and (iv) a fourth optical sensor disposed near a fourth corner of the tracking device, wherein each of the first optical sensor, the second optical sensor, the third optical sensor and the fourth optical sensor is configured to capture respective images of the surface while the tracking device is moved over the surface,
    wherein (i) the first corner is diagonally opposite to the third corner such that the first optical sensor and the third optical sensor are disposed on two diagonally opposite corners of the tracking device, and (ii) wherein the second corner is diagonally opposite to the fourth corner such that the second optical sensor and the fourth optical sensor are disposed on two diagonally opposite corners of the tracking device,
    wherein (i) the first corner and the second corner are on a first edge of the tracking device, (ii) the second corner and the third corner are on a second edge of the tracking device, (iii) the third corner and the fourth corner are on a third edge of the tracking device, and (iv) the fourth corner and the first corner are on a fourth edge of the tracking device, and
    wherein the first optical sensor, the second optical sensor, the third optical sensor and the fourth optical sensor are sequentially activated to capture respective images in a time alternated sequence such that (i) subsequent to activating the first optical sensor, the first optical sensor is deactivated and the third optical sensor is activated, (ii) subsequent to activating the third optical sensor, the third optical sensor is deactivated and the fourth optical sensor is activated, (iii) subsequent to activating the fourth optical sensor, the fourth optical sensor is deactivated and the second optical sensor is activated, and (iv) subsequent to activating the second optical sensor, the second optical sensor is deactivated and the first optical sensor is activated.

2. The tracking device of claim 1, wherein each of the first optical sensor, the second optical sensor, the third optical sensor and the fourth optical sensor is configured to capture respective images of the surface when the respective optical sensor is activated.

3. The tracking device of claim 1, wherein each of the first optical sensor, the second optical sensor, the third optical sensor and the fourth optical sensor is configured to refrain from capturing images of the surface when the respective optical sensor is deactivated.

4. The tracking device of claim 1, further comprising:
    a processor configured to determine the position of the tracking device in relation to the surface, based at least in part on the images captured by the first optical sensor, the second optical sensor, the third optical sensor and the fourth optical sensor.

5. The tracking device of claim 1, wherein:
    the first optical sensor is further configured to capture images of the surface at a first frequency; and
    the second optical sensor is further configured to capture images of the surface at a second frequency,
    wherein the first frequency is substantially the same as the second frequency.

6. The tracking device of claim 5, further comprising:
    a processor configured to determine the position of the tracking device in relation to the surface, based at least in part on the images captured by the first optical sensor, the second optical sensor, the third optical sensor and the fourth optical sensor,
    wherein the processor is further configured to determine the position of the tracking device at a frequency that is at least about twice the first frequency.

7. The tracking device of claim 1, wherein the first optical sensor is further configured to capture the images of the surface in a phase-shifted relationship relative to the images captured by the second optical sensor.

8. The tracking device of claim 1, further comprising:
    a processor configured to determine a magnitude of rotation of the tracking device in relation to the surface according to the images captured by the first optical sensor, the second optical sensor, the third optical sensor and the fourth optical sensor.

9. The tracking device of claim 1, further comprising:
    a processor configured to determine a rotation point of the tracking device in relation to the surface according to the images captured by the first optical sensor, the second optical sensor, the third optical sensor and the fourth optical sensor.

10. The tracking device of claim 1, wherein each of the first optical sensor, the second optical sensor, the third optical sensor and the fourth optical sensor is further configured to capture two-dimensional images.

11. A method for tracking a position of a tracking device in relation to a surface, the method comprising:
    moving the tracking device over the surface; and
    sequentially capturing, by a first optical sensor, a second optical sensor, a third optical sensor and a fourth optical sensor of the tracking device, images of the surface in a time alternated sequence while the tracking device is moved over the surface, wherein sequentially capturing the images comprises
        (A) subsequent to activating the first optical sensor, deactivating the first optical sensor and activating the third optical sensor,
        (B) subsequent to activating the third optical sensor, deactivating the third optical sensor and activating the fourth optical sensor,
        (C) subsequent to activating the fourth optical sensor, deactivating the fourth optical sensor and activating the second optical sensor, and
        (D) subsequent to activating the second optical sensor, deactivating the second optical sensor and activating the first optical sensor,
    wherein (i) the first optical sensor is disposed near a first corner of the tracking device, (ii) the second optical sensor is disposed near a second corner of the tracking device, (iii) the third optical sensor is disposed near a third corner of the tracking device, and (iv) the fourth optical sensor is disposed near a fourth corner of the tracking device, wherein (i) the first corner is diagonally opposite to the third corner such that the first optical sensor and the third optical sensor are disposed on two diagonally opposite corners of the tracking device, and (ii) wherein the second corner is diagonally opposite to the fourth corner such that the second optical sensor and the fourth optical sensor are disposed on two diagonally opposite corners of the tracking device, and wherein (i) the first corner and the second corner are on a first edge of the tracking device, (ii) the second corner and the third corner are on a second edge of the tracking device, (iii) the third corner and the fourth corner are on a third edge of the tracking device, and (iv) the fourth corner and the first corner are on a fourth edge of the tracking device.

12. The method of claim 11, wherein each of the first optical sensor, the second optical sensor, the third optical sensor and the fourth optical sensor is configured to capture respective images of the surface when the respective optical sensor is activated.

13. The method of claim 11, further comprising:
refraining, by each of the first optical sensor, the second optical sensor, the third optical sensor and the fourth optical sensor, from capturing images of the surface when the respective optical sensor is deactivated.

14. The method of claim 11, further comprising:
determining the position of the tracking device in relation to the surface, based at least in part on the images captured by the first optical sensor, the second optical sensor, the third optical sensor and the fourth optical sensor.

15. The method of claim 11, wherein:
the first optical sensor is further configured to capture images of the surface at a first frequency; and
the second optical sensor is further configured to capture images of the surface at a second frequency,
wherein the first frequency is substantially the same as the second frequency.

16. The method of claim 15, further comprising:
determining the position of the tracking device in relation to the surface, based at least in part on the images captured by the first optical sensor, the second optical sensor, the third optical sensor and the fourth optical sensor,
wherein the position of the tracking device is determined at a frequency that is at least about twice the first frequency.

17. The method of claim 11, wherein the first optical sensor is configured to capture the images of the surface in a phase-shifted relationship relative to the images captured by the second optical sensor.

18. The method of claim 11, further comprising:
determining a magnitude of rotation of the tracking device in relation to the surface, based at least in part on the images captured by the first optical sensor, the second optical sensor, the third optical sensor and the fourth optical sensor.

19. The method of claim 11, further comprising:
determining a rotation point of the tracking device in relation to the surface, based at least in part on the images captured by the first optical sensor, the second optical sensor, the third optical sensor and the fourth optical sensor.

20. The method of claim 11, wherein each of the first optical sensor, the second optical sensor, the third optical sensor and the fourth optical sensor is further configured to capture two-dimensional images.

* * * * *